United States Patent
Meyer et al.

(10) Patent No.: US 9,316,295 B2
(45) Date of Patent: Apr. 19, 2016

(54) TOOTHED-RACK STEERING GEAR

(75) Inventors: Daniel Meyer, Widnau (CH); Thomas Riepold, Widnau SG (CH); Philippe Steck, Belp (CH)

(73) Assignee: ThyssenKrupp Presta AG, Eschen (LI)

( * ) Notice: Subject to any disclaimer, the term of this patent is extended or adjusted under 35 U.S.C. 154(b) by 154 days.

(21) Appl. No.: 14/238,035

(22) PCT Filed: Jul. 19, 2012

(86) PCT No.: PCT/EP2012/003049
§ 371 (c)(1),
(2), (4) Date: Apr. 16, 2014

(87) PCT Pub. No.: WO2013/020640
PCT Pub. Date: Feb. 14, 2013

(65) Prior Publication Data
US 2014/0216184 A1    Aug. 7, 2014

(30) Foreign Application Priority Data

Aug. 10, 2011   (DE) .......................... 10 2011 109 878

(51) Int. Cl.
*B62D 7/16*      (2006.01)
*F16H 19/04*     (2006.01)
*B62D 3/12*      (2006.01)
*F16H 55/28*     (2006.01)

(52) U.S. Cl.
CPC ............... *F16H 19/04* (2013.01); *B62D 3/123* (2013.01); *F16H 55/283* (2013.01); *Y10T 74/18096* (2015.01)

(58) Field of Classification Search
USPC ............... 280/93.51, 93.511, 93.512, 93.514
See application file for complete search history.

(56) References Cited

U.S. PATENT DOCUMENTS

| 7,815,204 | B2 * | 10/2010 | Kaida | B62D 3/123 280/93.514 |
| 8,256,315 | B2 * | 9/2012 | Song | B62D 3/123 280/93.51 |
| 8,348,289 | B2 * | 1/2013 | Tanaka | B62D 3/123 280/93.514 |

(Continued)

FOREIGN PATENT DOCUMENTS

| DE | 2049386 A1 | 4/1972 |
| DE | 2634054 A1 | 2/1978 |

(Continued)

OTHER PUBLICATIONS

International Preliminary Report on Patentability issued in PCT/EP2012/003049, issue date Feb. 11, 2014.

(Continued)

*Primary Examiner* — Toan To
(74) *Attorney, Agent, or Firm* — Panitch Schwarze Belisario & Nadel LLP

(57) ABSTRACT

A rack and pinion steering gear for a motor vehicle may include a steering pinion, which is connected to a steering shaft and is engaged with a gear rack that is movably mounted in a housing, and may further include a pressure piece arranged in the housing in a pressure piece bore, and which may keep the gear rack engaged free from play with the steering pinion. A pressure piece for a rack and pinion steering gear may include an outer metallic casing inserted with a press fit into the pressure piece bore, at least one elastomer damping element, in particular an elastomer casing, arranged in the metallic casing, with a metallic pressure piece core enclosed by the at least one elastomer damping element.

9 Claims, 1 Drawing Sheet

(56) References Cited

U.S. PATENT DOCUMENTS

| | | | | |
|---|---|---|---|---|
| 8,465,034 | B2 * | 6/2013 | Heo | B62D 3/123 |
| | | | | 280/779 |
| 8,925,939 | B2 * | 1/2015 | Ohashi | B62D 3/12 |
| | | | | 280/93.514 |
| 9,003,909 | B2 * | 4/2015 | Yang | B62D 3/123 |
| | | | | 280/93.514 |

FOREIGN PATENT DOCUMENTS

| DE | 10247331 A1 | 5/2004 |
|---|---|---|
| DE | 102004004390 A1 | 8/2005 |
| DE | 102006023795 A1 | 9/2007 |
| DE | 102009028031 A1 | 2/2011 |
| EP | 1084933 B1 | 12/2001 |
| FR | 2760219 A1 | 9/1998 |

OTHER PUBLICATIONS

International Search Report and Written Opinion issued in PCT/EP2012/003049, mailing date Oct. 15, 2012, with English translation of International Search Report.

* cited by examiner

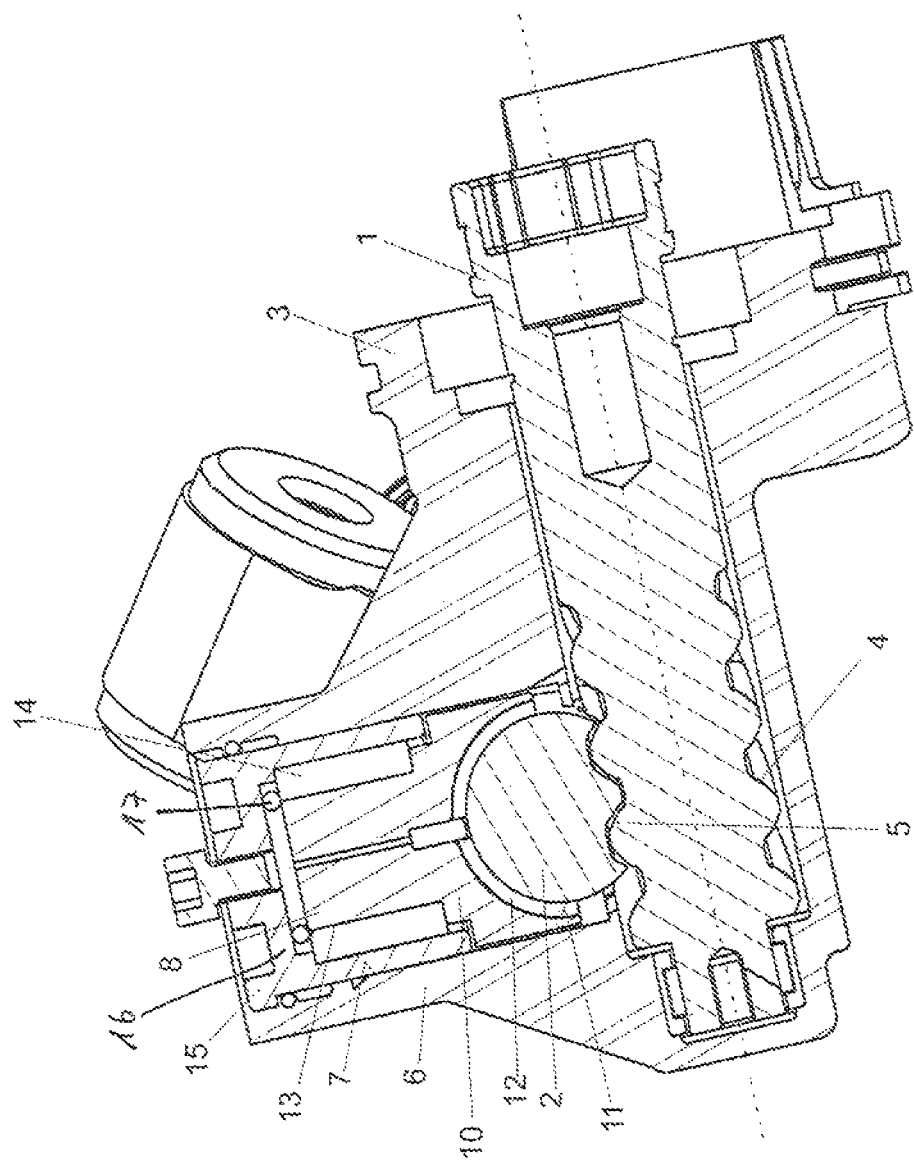

TOOTHED-RACK STEERING GEAR

CROSS-REFERENCE TO RELATED APPLICATIONS

This Application is a National Stage of PCT International Application No. PCT/EP2012/003049, filed on Jul. 19, 2012, and claims priority of German Patent Application No. 102011109878.3, filed on Aug. 10, 2011. The disclosures of the aforementioned applications are incorporated herein by reference in their entireties.

FIELD OF ENDEAVOR

The present invention relates to a rack and pinion steering gear and to a pressure piece for a rack and pinion steering gear.

BACKGROUND

With generic rack and pinion steering gears, a steering shaft transfers the steering torque applied to a steering wheel by a driver to an input shaft of a steering gear. The input shaft of the steering gear is designed as a pinion and meshes with a gear rack which is movably mounted in the longitudinal direction in the housing of the steering gear. A rotation of the input shaft and of the pinion is thereby converted into a sliding movement of the gear rack. The gear rack itself is connected to the steered wheels of the motor vehicle via track rods. The turning of the steering wheel is in this way converted into a steering movement of the steered wheels.

The meshing of the gear teeth between the pinion and the gear rack should be as free from play as possible. In order to achieve this, the gear rack is usually pressed against the pinion by a spring-loaded pressure piece. The pressure piece itself abuts on the surface of the gear rack facing away from the gear teeth and sits in a generally cylindrical bore of the steering gear housing. The simplest form of the pressure piece is a metallic pressure piece which is plain bearing mounted in the cylindrical bore and pretensioned against the gear rack by a coil spring. Due to the friction between the gear rack and the pressure piece, when the gear rack is moved back and forth such a pressure piece is alternately pressed against the walls of the bore in the movement direction of the gear rack. In the process, noises-so-called pressure piece rattling-occur.

Various approaches are known for reducing or completely preventing pressure piece rattling. With some solutions, a plastic or rubber element is inserted between the pressure piece and the pressure piece bore, which damps the movement of the pressure piece and is to prevent direct metal contact. A rack and pinion steering gear is therefore known from the patent specification EP 1 084 933 B1, in which it is ensured that a pressure piece is guided free from rattling in a bore of a steering gear housing via an o-ring arranged in an eccentric groove. The publication DE 2 634 054 A1 describes a pressure piece which is mounted itself in a metallic casing and is pressed against the gear rack by a coil spring acting between the casing and the pressure piece. The metallic casing is in turn provided with a rubber bushing on its outer circumferential surface, which supports the casing in the radial direction of the bore against the steering gear housing. Direct metal contact between the casing and the housing is to be prevented in this way. The rubber casing is not or only slightly stressed in the axial direction of the bore, since the metallic casing does not follow the axial movements of the pressure piece. This design is complex and complicated to assemble. A pressure piece is known from the publication DE 10 2009 028 031 A1 which has damping elements consisting of an elastomer arranged on its edge. These damping elements prevent direct metal contact between the pressure piece and the steering gear housing. Assembling this pressure piece, in which the elastomers are mounted under pretension, is complicated. In addition, there is the risk that through movements of the pressure piece wearing of the elastomers occurs.

The publication DE 10 2004 004 390 A1 shows another way. Here, a pressure piece is proposed which holds a metallic tolerance strip in a circumferential groove, by means of which the pressure piece can be inserted fitting perfectly and free from play into the bore. The free from play assembly and the purely metallic components are not supposed to damp the relative movement of the pressure piece with respect to the housing, which leads to rattling noises, but fully prevent it. This technical solution is very complicated to manufacture, since after the manufacture of the pressure piece and the steering gear housing the tolerances have to be measured and then a correspondingly fitting tolerance strip has to be selected, by means of which the fitting is adjusted free from play but not sticking. In addition to the precise measurement of the components during manufacture, a large number of tolerance strips of different dimensions are required to be held available and selected from.

DE 10 2006 023 795 A1 shows a pressure piece arrangement having an outer casing which can be pressed in a receiving bore of the steering gear by means of a press fit. A pressure piece is arranged in the casing and is pressed against the gear rack by means of an annular elastomer spring and a coil spring. The elastomer spring only acts in the axial direction of the arrangement. It does not surround or enclose the pressure piece. The pressure piece is instead guided directly in the case.

DE 102 47 331 A1 shows a pressure piece unit consisting of a casing which is pressed into a receiving bore of a steering gear. The pressure piece is supported laterally with respect to the casing via an o-ring inserted loose into a groove. Relative movements occur between the o-ring and the casing in operation which cause friction and wear. The o-ring does not produce any axial contact pressing force. The contact pressing force of the pressure piece on the gear rack is produced via a coil spring. The pressure piece has a particularly low noise level owing to its manufacture from a plastic material.

DE 2 049 386 describes a pressure piece which is pressed against the gear rack via an elastomer spring. Here, the elastomer spring only replaces the coil spring which is usually provided. The elastomer spring has an outer casing, a tubular elastomer and an inner casing. The spring action occurs by shearing stress, or more precisely by shearing forces, when the two metallic casings are displaced against one another in the axial direction. In this document, the pressure piece itself is directly guided in a receiving bore of the steering gear housing and is in direct metal contact with it. In operation, a relative movement takes place between the pressure piece and the receiving bore in the housing. This causes friction and wear.

The known solutions are either complex during production and assembly or they are prone to pressure piece rattling.

Therefore, it is the object of the present invention to create a rack and pinion steering gear, in which the pressure piece rattling does not occur and which is nevertheless easy to assemble and has low wear in operation.

BRIEF SUMMARY OF ASPECTS OF THE DISCLOSURE

This object is achieved by a rack and pinion steering gear for a motor vehicle which has the following features:

a steering pinion, which is connected to a steering shaft and is engaged with a gear rack which is movably mounted in a housing, a pressure piece, which is arranged in the housing in a pressure piece bore and keeps the gear rack engaged free from play with the steering pinion, wherein the pressure piece has an outer metallic casing which is inserted with a press fit into the pressure piece bore, at least one elastomer damping element is arranged in the metallic casing and a metallic pressure piece core is arranged which is enclosed by the at least one elastomer damping element.

Due to the fact that the pressure piece has an outer metallic casing, which is inserted into the pressure piece bore with a press fit, in the casing at least one elastomer damping element is arranged essentially coaxially and a metallic pressure piece core is arranged in turn approximately coaxially enclosed by at least one elastomer damping element, the outer metallic casing cannot move with respect to the pressure piece bore of the gear housing due to the press fit. Noises at this place are thereby eliminated. The elastomer layer arranged in the metallic casing allows slight movements of the pressure piece core which is in turn arranged therein. These movements, however, do not result in the noises known as pressure piece rattling, since no direct metal contact occurs. At the same time, the at least one elastomer damping element can preferably be formed by a one-piece casing. It is also conceivable and possible, however, to use a plurality of rod-like elastomer damping elements which are arranged between the pressure piece core and the outer metallic casing.

Due to the fact that in addition the outside of the at least one elastomer damping element or of the elastomer casing is or are permanently joined to the metallic casing and the inside of the at least one elastomer damping element or of the elastomer casing is or are permanently joined to the pressure piece core, the at least one elastomer damping element or the elastomer casing is or are admittedly subjected to compressive stress and shearing force. However, no relative movements occur on the surface of the elastomer, so that wearing of the elastomer due to friction is eliminated. The components can be permanently joined by suitable material selection and dimensioning, so that they can be joined by means of a press-fit operation. However, the components can also be joined by adhesive bonding or vulcanisation. Provision can also be made for different joining techniques to be selected between the casing and the elastomer, on the one hand, and the elastomer and the pressure piece core, on the other hand. These different joining techniques, however, both prevent a relative movement of the surfaces against one another in operation.

In particular, the components, the metallic casing, the at least one elastomer damping element or elastomer casing and the pressure piece core can be joined together by vulcanisation, so that a one-piece component is formed. This component is particularly easy to mount, since it can be pressed as a whole into the pressure piece bore. If the at least one elastomer damping element or the elastomer casing is put under shearing stress in the axial direction of the pressure piece bore when assembling the pressure piece, the at least one elastomer damping element or the elastomer casing causes the pressure piece core to be pretensioned against the gear rack. A separate pressure piece spring can then be dispensed with. With suitable dimensioning, the usual screw fitting for closing the pressure piece bore and for supporting the pressure piece can even be dispensed with. Overall, a rack and pinion steering gear results which is particularly easy to manufacture and has a low noise level in operation and is reliable in the long term. The costs are thereby lowered and the durability increased.

It is further the object of the present invention to provide a pressure piece which can be easily installed in a rack and pinion steering gear and has low wear in operation and has minimal pressure piece rattling.

The object is achieved by a pressure piece for a rack and pinion steering gear for a motor vehicle which can be inserted into a pressure piece bore of a housing for mounting a gear rack of the rack and pinion steering gear, wherein the pressure piece has an outer metallic casing which can be inserted with a press fit into the pressure piece bore, wherein at least one elastomer damping element is arranged in the metallic casing, and wherein a metallic pressure piece core is arranged which is enclosed by the at least one elastomer damping element.

Preferably, the at least one elastomer damping element is formed by an elastomer casing which encloses the pressure piece core.

To make assembly easier, provision can be made for the outside of the elastomer damping element to be permanently joined to the metallic casing and for the inside of the elastomer damping element to be permanently joined to the pressure piece core, in particular by means of vulcanisation, so that they form a one-piece component.

The side of the casing facing away from the gear rack can also be fully or partly closed by a front wall. It is then formed further in the shape of a cup. An elastomer spring can then be provided between the pressure piece and/or the elastomer damping element, on the one hand, and the front wall, on the other hand, which rests against the front wall and which reinforces and supports the contact pressing force in the axial direction between the pressure piece and the casing. This elastomer spring can be advantageously assigned the function of a progressively acting spring-loaded and damping stop element.

In a further embodiment, the casing itself can be provided with an external screw thread which can be screwed into a compatible internal screw thread of the pressure piece dome of the rack and pinion steering gear. The adjustability of the pressure piece pretension can thereby be improved when assembling the steering gear.

The pressure piece core itself is manufactured from a metallic material, so that a permanent connection with the elastomer damping element can be produced in a particularly easy and durable manner, in particular by means of vulcanisation as described above. There is also the advantage that the mass of the pressure piece core is greater compared to pressure pieces and pressure piece cores made of plastic, which is usually considered a disadvantage. However, here the larger mass enables the dynamic vibration behaviour to be controlled better in operation, since the combination of pressure piece core and elastomer damping element represents a vibratory system.

BRIEF DESCRIPTION OF THE DRAWING

An exemplary embodiment of the present invention is described in more detail below with the aid of the drawing which shows:

FIG. 1: a rack and pinion steering gear according to the invention in a sectional view along the pressure piece axis.

DETAILED DESCRIPTION OF ASPECTS OF THE DISCLOSURE

The description of the features of the pressure piece according to the invention can also be inferred from the description of the rack and pinion steering gear.

FIG. 1 shows a sectional view through a steering gear along the rotational axis of a steering pinion 1 and transverse to the longitudinal axis of a gear rack 2. The steering pinion 1 is pivot-mounted in a steering gear housing 3 and provided with gear teeth 4. The gear teeth 4 mesh with corresponding gear teeth 5 of the gear rack 2, so that the gear rack 2 moves perpendicular to the plane of projection when the steering pinion 1 is rotated. The steering gear housing 3 holds an approximately tubular dome 6 which surrounds a pressure piece bore 7. A pressure piece 8 is arranged in the pressure piece bore 7 and is described in more detail below.

The pressure piece 8 comprises a pressure piece core 10 which is manufactured from a metallic material, preferably from steel. The side of the pressure piece core 10 facing the gear rack 2 is provided with a concave, approximately semi-cylindrical profile 11 which encompasses about 50% of the circumference of the gear rack 2. A friction insert 12 is located in the profile 11 which reduces the friction between the pressure piece 8 and the gear rack 2 when the gear rack 2 is moved perpendicular to the plane of projection. The pressure piece core 10 is not in direct contact with the wall of the dome 6. Above the profile 11 at an increasing distance from the gear rack 2 the pressure piece core 10 is stepped and in an area of narrower diameter 13 the pressure piece core 10 is circular-cylindrical. The area 13 is surrounded externally by an elastomer damping element which is simply called an elastomer casing 14 in the following and which is manufactured from an elastomeric material. The elastomer casing 14 is vulcanised onto the area 13. The elastomer casing 14 is surrounded by a metal casing 15 on its outer circumferential surface, to which the elastomer casing 14 is also permanently joined, for example by vulcanisation. As a result, the pressure piece core 10 can only move with respect to the steel casing 15 to the degree which the elasticity of compression and shear elasticity of the elastomer casing 14 allow.

The steel casing 15 is firmly inserted with a press fit into the pressure piece bore 7 of the dome 6. Due to the press fit the steel casing 15 is fixed in the dome 6 within the context of the forces which occur during operation of the rack and pinion steering gear and it consequently cannot produce any noise in contact with the steering gear housing 3. The pressure piece core 10 is only connected to the gear rack 2 via the friction insert 12 and is only connected to the steel casing 15 via the elastomer casing 14. There is no direct metal contact with other components. In addition, when the gear rack 2 moves, which can occur when the steering gear 3 is in operation, for example due to the retroactive effects of the steered wheels on the steering gear, the pressure piece core 10 of the pressure piece 8 does not come into contact with other metallic components and consequently cannot produce the noises known as pressure piece rattling.

The pressure piece 8 is particularly advantageous due to the fact that the pressure piece core 10, the elastomer casing 14 and the steel casing 15 can be permanently joined together by vulcanisation. The pressure piece 8 is then formed as a one-piece component. It can be inserted into the dome 6 by pressing and then sits firmly therein. Further assembly steps are not required. The components can be dimensioned in such a way that the elastomer casing 14 is under shearing stress which presses the pressure piece core 10 and the friction insert 12 against the gear rack 2. In this way, the required pretensioning of the gear rack 2 in engaging the gear teeth 4, 5 is also brought about, so that no further spring for pretensioning the pressure piece 8 is required. The number of parts and the manufacturing cost and effort are thereby reduced although the function with regard to possible noise development is improved.

In a preferred embodiment, as is illustrated in FIG. 1, the front side of the steel casing 15 facing away from the gear rack 2 can be provided with a one-piece integrally formed front wall 16 which covers the elastomer casing 14 on the outside and in this way protects against environmental influences. Additionally, an elastomer spring element 17, for example in the form of an o-ring, can be arranged between the front wall 16, on the one hand, and the pressure piece core 10 and/or the elastomer casing 14, on the other hand. This elastomer spring element 17 supports the axial pretensioning of the pressure piece core and also acts as a progressively damping stop element, in order to limit the path of the pressure piece core 10 in the direction away from the gear rack 2, without the pressure piece core 10 being able to strike the (metallic) front wall 16. The creation of disturbing noise in operation is thereby further reduced.

Even though a semi-circular friction insert 12 seen in cross-section is illustrated in the example, other profiles are also conceivable and possible. For example, friction inserts with a V-shaped profile or a Y-shaped profile can also be used. The design of the friction insert is to be interpreted as corresponding to the design of the back of the gear rack.

To the extent to which they may be applicable, all features, which are illustrated as individual embodiments of the invention, can be freely combined with one another without departing from the scope of the invention.

What is claimed is:

1. A rack and pinion steering gear for a motor vehicle, including:
   a steering pinion connected to a steering shaft;
   a gear rack, that is movably mounted in a housing, wherein the steering pinion is engaged with the gear rack, the gear rack including a pressure piece, which is arranged in the housing in a pressure piece bore, and which is configured to keep the gear rack engaged free from play with the steering pinion,
   wherein the pressure piece has an outer metallic casing inserted with a press fit into the pressure piece bore, wherein at least one elastomer damping element is arranged in the metallic casing, that wherein a metallic pressure piece core is enclosed by the at least one elastomer damping element, and wherein an outside of the elastomer damping element is permanently joined to the metallic casing and an inside of the elastomer damping element is permanently joined to the pressure piece core.

2. The rack and pinion steering gear according to claim 1, wherein the at least one elastomer damping element is formed by an elastomer casing that encloses the pressure piece core.

3. The rack and pinion steering gear according to claim 2, wherein the metallic casing, the elastomer damping element and the pressure piece core are joined together by means of vulcanisation, so that they form a one-piece component.

4. The rack and pinion steering gear according to claim 1, wherein the pressure piece core is configured to be moved with respect to the casing against a restoring force of the elastomer damping element without coming into contact with the casing.

5. The rack and pinion steering gear according to claim 1, wherein the elastomer damping element is put under shearing stress in an axial direction of the pressure piece bore, so that the elastomer damping element causes the pressure piece core to be pretensioned against the gear rack.

6. The rack and pinion steering gear according to claim 1, wherein the pressure piece is configured to fully close the pressure piece bore on a side facing away from the gear rack.

7. A pressure piece for a rack and pinion steering gear for a motor vehicle and configured to be inserted into a pressure piece bore of a housing for mounting a gear rack of the rack and pinion steering gear, the pressure piece comprising:
- an outer metallic casing configured to be inserted with a press fit into the pressure piece bore;
- at least one elastomer damping element arranged in the outer metallic casing; and
- a metallic pressure piece core enclosed by the at least one elastomer damping element.

8. The pressure piece according to claim 7, wherein the at least one elastomer damping element comprises an elastomer casing arranged to enclose the pressure piece core.

9. The pressure piece according to claim 7, wherein an outside of the elastomer damping element is permanently joined to the metallic casing and an inside of the elastomer damping element is permanently joined to the pressure piece core by means of vulcanisation, so that they form a one-piece component.

* * * * *